(12) United States Patent
Jaakkola et al.

(10) Patent No.: US 6,356,537 B1
(45) Date of Patent: Mar. 12, 2002

(54) RADIO INTERFACE CARD FOR A BROADBAND WIRELESS ATM SYSTEM

(75) Inventors: Al an Jaakkola, Kanata; Donna Godin, Quebec, both of (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/161,435

(22) Filed: Sep. 24, 1998

(30) Foreign Application Priority Data

Jul. 9, 1998 (CA) ............................................. 2242846

(51) Int. Cl.[7] .......................... H04L 12/26; H04L 12/56
(52) U.S. Cl. ...................... 370/310.2; 370/338; 370/330
(58) Field of Search ................................. 370/328, 329, 370/338, 395, 310, 330, 337, 343, 344, 345, 347, 349

(56) References Cited

U.S. PATENT DOCUMENTS 6,009,096 A * 12/1999 Jaisingh et al. ............. 370/395
6,188,680 B1 * 2/2000 Ohki ........................... 370/338
6,034,950 A * 3/2000 Sauer et al. ................. 370/328
6,052,371 A * 4/2000 Lemieux ...................... 370/395

FOREIGN PATENT DOCUMENTS

WO  WO 97/21285  6/1997
WO  WO 97/28616  8/1997
WO  WO 97/29559  8/1997

* cited by examiner

*Primary Examiner*—Ricky Ngo
(74) *Attorney, Agent, or Firm*—Marks & Clerk

(57) ABSTRACT

A radio interface card for use in a base station of a broadband wireless ATM system to support bi-directional communications with customer premise network interface units (NIUs) over a wireless link. The ATM radio interface card (ARIC) includes a modem for modulating data received from an ATM backbone connected to the base station into a point to multipoint format for transmission over the link to the NIUs. A demodulator in the ARIC supports a point to point protocol for processing digital communications received from distributed NIUs located within a geographic area.

14 Claims, 7 Drawing Sheets

RADIO INTERFACE CARD FOR A BROADBAND WIRELESS ATM SYSTEM

FIELD OF THE INVENTION

This invention relates to broadband wireless communications between a base station and customer sites located within a geographical area and more particularly to an ATM Radio Interface Card (ARIC) for use in a cellular, broadband wireless communication system which combines multiplexing, switching and modulation schemes to provide both low and high bandwidth service functionality.

BACKGROUND

Broadband wireless systems such as Local Multipoint Distribution Systems (LMDS), known as Local Multipoint Communication System (LMCS) in Canada, are being developed to provide point to multipoint, high bandwidth services between a base station connected to a backbone such as an asynchronous transfer mode (ATM) network and network interface units (NIUs) at fixed locations within a defined geographic area or cell. A wireless link between the base station and the NIUs operates at a wireless radio frequency (RF) typically in the 2.5 to 40 GHz range depending on the allocated frequency license. A transmitter/receiver at the base station and a transceiver at each NIU site supports bi-directional, broadband "last mile" communication between a service provider and a customer.

Traditional wireless access systems employ one polarization or another (vertical or horizontal, for example) as a means for delivering services over a radio medium to a given customer(s) site. These systems tend to be optimized for specific types of services that are largely dictated by the radio licensing structure and/or regulatory requirements.

With the advent of broadband licensing (LMDS/LMCS, for example), large numbers of different service types can be offered using a common delivery infrastructure. These varying services can be low bandwidth in nature (so called POTS, T1 or E1, fractional T1 or E1, Ethernet, or other, for example) or can be high bandwidth in nature (so called T3 or E3, OC-n, or other, for example).

Typically, the low bandwidth services are more cost effectively delivered through the sharing of radio resources. Sharing radio resources can be achieved by sharing resources in time, for example, using techniques such as time-division-multiple-access, (TDMA). This technique divides a given radio communication channel up into time slots which are allocated in a fixed or dynamic manner to the various customer-site equipment which are sharing this radio channel/resource. Although this tends to be more cost effective, this type of access technique commonly employs lower efficiency modulation schemes, quadrature-phase-shift-keying (QPSK), for example, which utilize more spectrum/license.

Typically the high bandwidth services are not as cost sensitive but demand much more capacity and therefore need to be connected using high efficiency modulation techniques, quadrature-amplitude-modulation (QAM), for example. These are not amenable to radio resource sharing and therefore are more optimally run within independent radio channels. The technique of using a number of independent radio channels serving one customer site each is referred to as frequency-division-multiplexing (FDM).

PRIOR ART

International PCT application WO 97/29559 by Evans et al, published on Aug. 14, 1997, and assigned to Standford Telecommunications, Inc. relates to a broadband wireless ATM system and in particular, discloses a protocol for effecting point-to-multipoint communications between a base station and a plurality of users. The protocol utilizes time-division-multiplexing (TDM) in the direction of the base station to the users (the downstream direction) and time-division-multiple-access (TDMA) in the direction of the user to the base station (the upstream direction).

The downstream and upstream transmissions are carried on radio frequency (RF) waveforms by either QPSK modulation or QAM modulation but not both concurrently.

SUMMARY OF THE INVENTION

This invention is applicable to wireless multipoint access systems that employ a cellular approach to provide service coverage to fixed customer sites within a given geographical area.

This is achieved by using shared radio access techniques which optimally allow multipoint connections of low bandwidth services as well as high bandwidth services to significantly enhance the use/applicability of broadband multipoint access systems.

Generally, the system includes interface means associated with a base station to accommodate both low and high bandwidth services and switching means at the base station to deliver the appropriate service.

Therefore, in accordance with a first aspect of the present invention there is provided an ATM radio interface card (ARIC) for use in a base station of a broadband wireless system for digital communication between an ATM backbone and a network interface unit (NIU) at a customer site over a wireless link, the ARIC comprising: a modem for modulating the digital communication from the ATM backbone; a tuner for converting the modulated communication to a radio frequency (RF) signal; and a control module for controlling transmission of the RF signal.

In a preferred embodiment of the invention the backbone is an asynchronous transfer mode (ATM) network and the radio interface means includes a pair, or more, of ATM radio interface cards (ARICs), one of a pair for TDMA and the second of a pair for frequency division multiple access (FDMA).

In accordance with a second aspect of the invention there is provided a method for communicating digital information between a base station and a network interface unit (NIU) over a wireless link comprising: providing at the base station an ATM radio interface card (ARIC) having a modem, a tuner, and a controller; configuring the digital information at the modem into an intermediate frequency (IF) signal; converting the IF signal into a radio frequency (RF) signal at the tuner; and delivering the RF signal to a transmitter for transmission to the NIU over the wireless link.

BRIEF DESCRIPTION OF THE DRAWINGS

The invention will now be described in greater detail with reference to the attached drawings wherein.

DETAILED DESCRIPTION OF THE INVENTION

Figure 1:
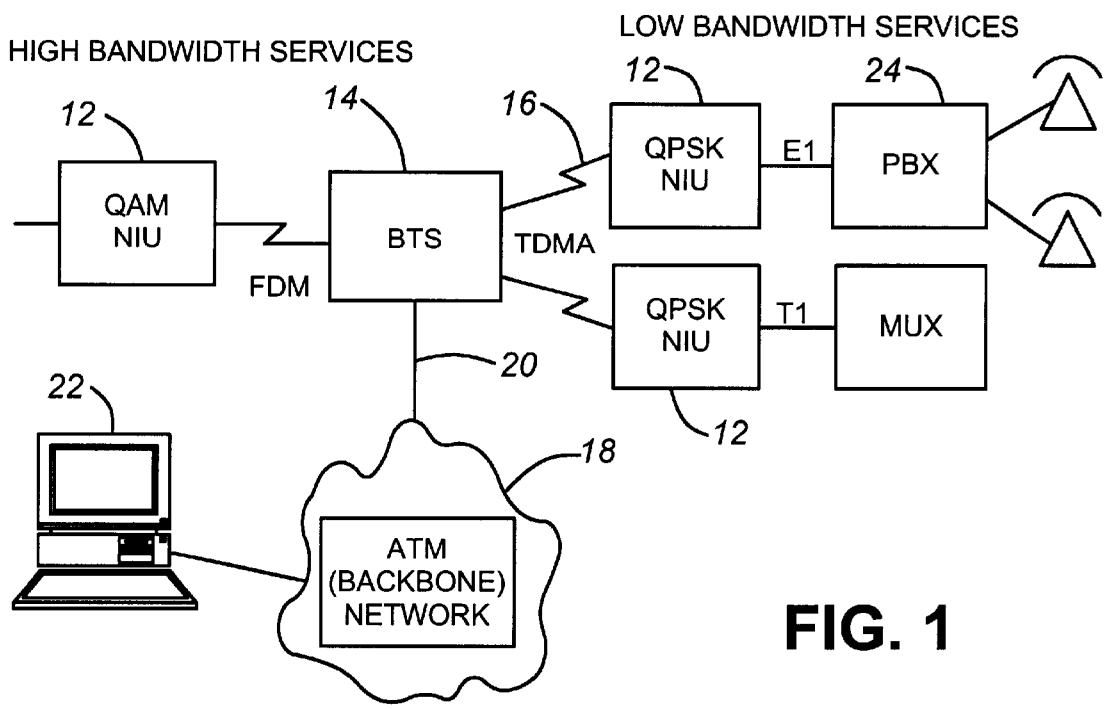
FIG. 1 illustrates a broadband wireless system architecture.

FIG. 1 shows a simple configuration of a Broadband Wireless System. The Broadband Wireless System embodies a network of Network Interface Units (NIUs) 12 connected to Base Stations (BTSs) 14 via wireless links 16 and the Base Stations 14 are, in turn, connected to a Backbone Network 18 via wired or point to point wireless links 20. The system is augmented by a Network Manager 22, and is targeted at fixed wireless broadband applications, such as local access loops, point-to-point links, etc.

The backbone system 18 in a preferred embodiment is an ATM network interconnecting all BTSs 14 to various services and to the network manager 22, and/or an element manager (not shown). Examples of the network manager and element manager are the Newbridge Mainstreet 46020 and Newbridge Mainstreet 45020, respectively. A BTS may also function as a backbone component.

The BTS is the hub that delivers and collects all the wireless traffic from and to the subscribers in the BTS coverage area. The BTS is also the linking point between the subscribers and the Backbone Network.

A NIU 12 is situated at the subscriber location. The NIU is used to provide a wireless connection between customer premise equipment (CPE) 24 and the BTS. A variety of CPEs may be situated at a subscriber location. These will include PBXs, MUXs, for example, for low or high bandwidth services.

According to the invention employment of both FDMA and TDMA shared radio access techniques optimally allows multipoint connection of low bandwidth services as well as high bandwidth services, thereby significantly enhancing the use/applicability of broadband multipoint access systems.

A specific example of this technique is the combination of TDMA/QPSK (for low bandwidth service connections) and FDMA/QAM (for high bandwidth service connections) within the same system, e.g. an ATM switch such as a Newbridge 36170, whereby the system infrastructure may connect over wireless links all types of services with optimized cost and efficiency.

Service offerings to subscribers may be deployed as a function of data bandwidth per site, namely the area and NIU therein being serviced by a particular BTS. QPSK/ TDMA may be used to connect services running at <10 Mb/s per site, for example, generally referred to as low bandwidth services, for a point-to-multipoint access configuration. Examples of low bandwidth services are T1/E1connections, N*T1/E1 and fractions thereof down to 64 kb/s channels, 10 BaseT, Ethernet, and POTS (plain old telephone service).

16/64 QAM/FDMA may be used to connect services running at >10 Mb/s per site, for example, generally referred to as high bandwidth services, for a point-to-point access configuration. Examples of high bandwidth services are ATM 25, fractional F-OC3 & DS-3, and aggregate services (i.e., combinations of T1s, Ethernet, MPEG).

Figure 2:
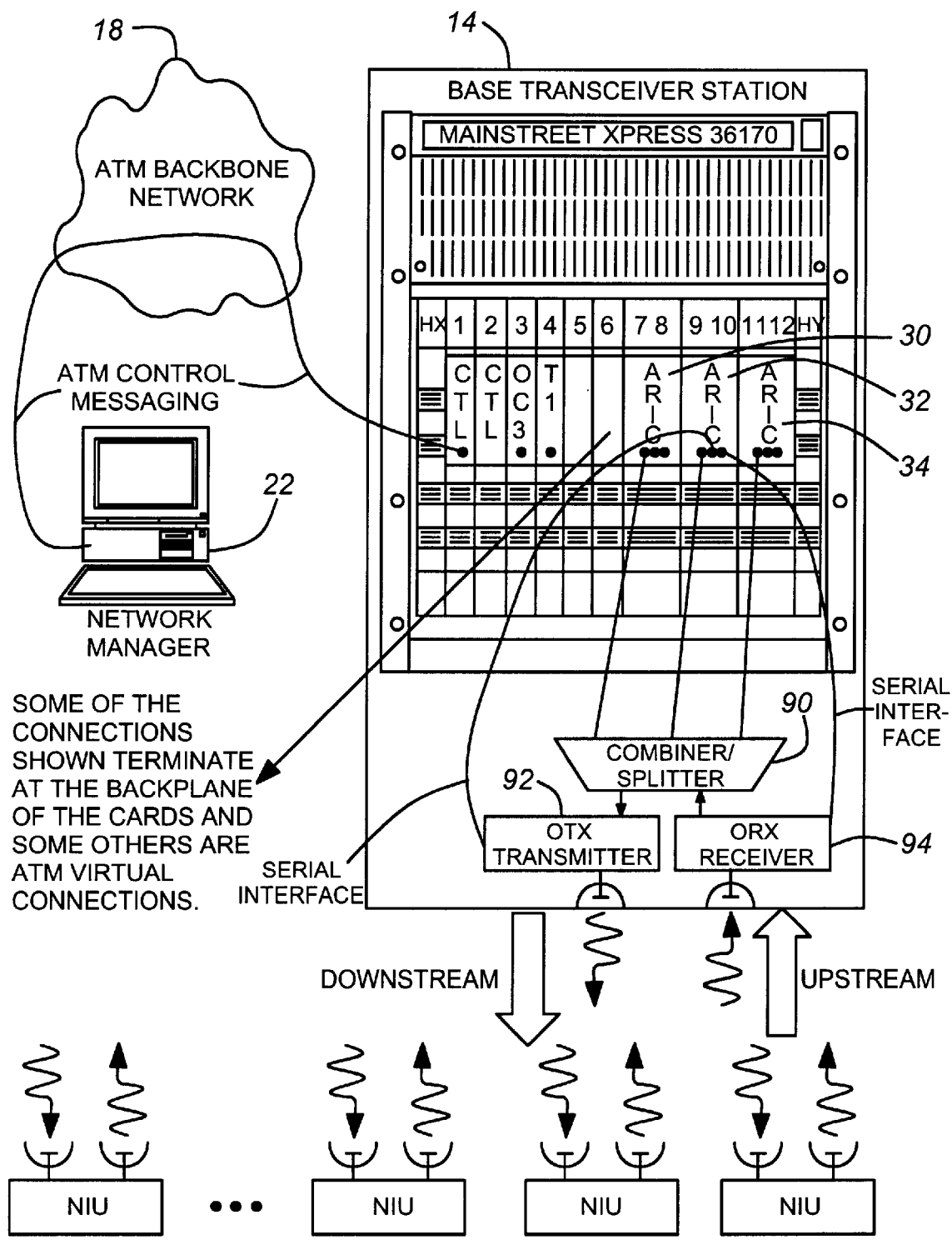
FIG. 2 is a high level illustration of a Base Transceiver Station (BTS)

The BTS 14 in a preferred embodiment consists of an ATM switch such as a Newbridge 36170, or equivalent, which contains ATM Radio Interface cards (ARICs) 30, 32, 34 and any cards required for network connectivity along with external RF equipment as shown in FIG. 2.

Figure 3:
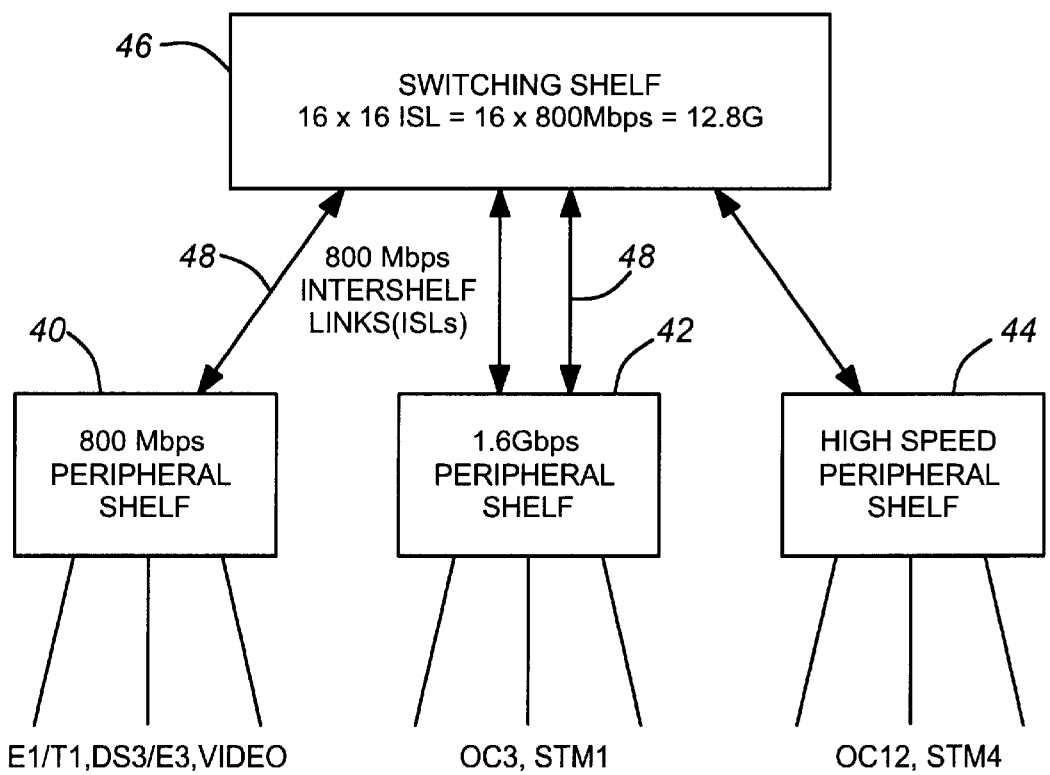
FIG. 3 illustrates the basic components of a Newbridge 36170 multi-technology switch.

FIG. 3 shows the basic components of a Multi-shelf Newbridge 36170. Peripheral Shelves 40, 42 and 44 are connected to a Switching Shelf 46 via Intershelf Links (ISL) 48.

Figure 4:
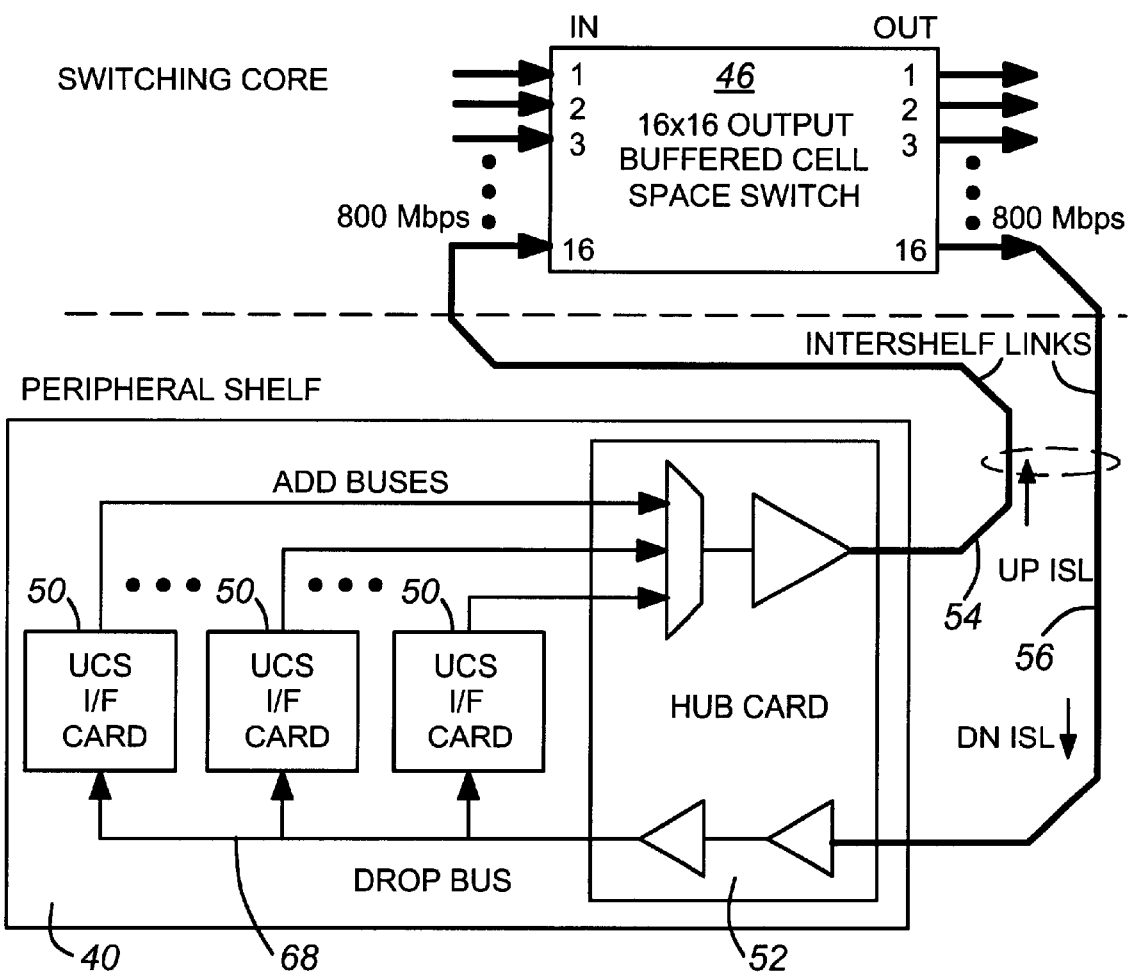
FIG. 4 illustrates the switching core of the switch of FIG. 3 with links to a peripheral interface unit.

FIG. 4 shows a more detailed view of the attachment of a Peripheral Shelf to the Switching Shelf 46 (or Switching Core). The Peripheral Shelf 40 is a 19" rack-mount unit capable of housing several (e.g. 12) universal card slot (UCS) Cards 50 and a pair of redundant Hub Cards 52. The Hub Cards are positioned at both ends of the shelf. Only one Hub Card 52 is shown in FIG. 4.

UCS cards typically implement an interface adaptation function whereby data traffic carried on a physical link connected to the card is adapted to and from payload ATM cells or a cell relay function. Examples of interface cards include T1/E1, circuit emulation and OC-3.

The Hub Card 52 collects data cells from the UCS cards 50 and sends them up to the Switching Core 46 via the UP-ISL 54. The Switching Core 46 returns data cells to the destination Peripheral Shelf 40 via the appropriate DN-ISL 56.

There are two different types of data cells in the Newbridge 36170: Point-to-point cells—where there is one and only one destination; and Point-to-Multipoint (or Multicast) cells—where a data cell may have many destinations, i.e. one cell going up the UP-ISL 54 may result in up to 16 cells coming down the Switching Shelf's DN-ISLs 56 (one cell on each DN-ISL).

Figure 5:
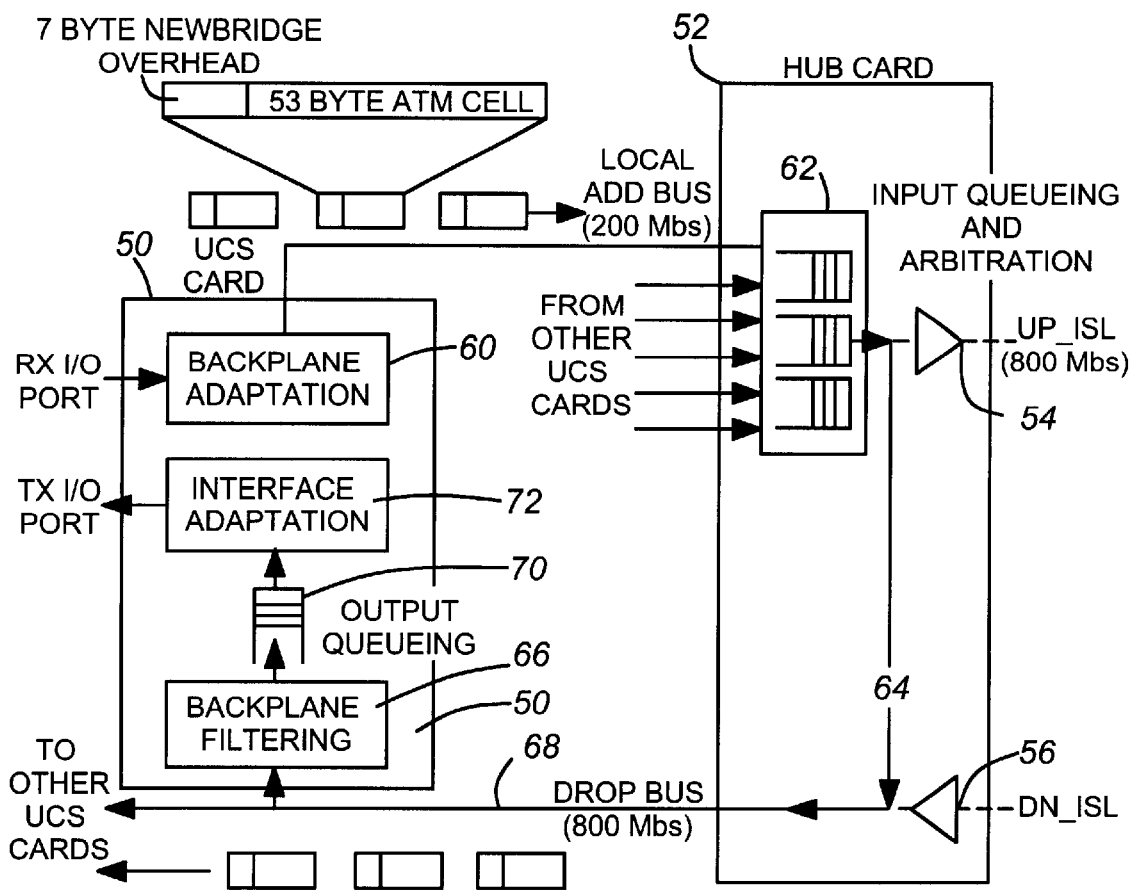
FIG. 5 is a high level drawing of a cell switching arrangement according to the switch of FIG. 3.

FIG. 5 shows at a high level how cell switching is accomplished in the Newbridge 36170 System. Cell switching can be broken into the following five steps:

1. Backplane Adaptation 60: Data is either segmented (for an Adaptation Card) or mapped (for a Cell Relay Card) into ATM-like Cells before being transmitted on the Local Add Bus to the Hub Card. Seven bytes of Newbridge header overhead are added to the five bytes of ATM overhead to form a 60 byte Newbridge Cell. The Newbridge header contains the Priority of the attached ATM Cell, the UCS Destination Address as well as whether the Cell is a point-to-point cell or a Multicast Cell.

The above actions are referred to as Ingress processing on the UCS card.

2. Arbitration Queuing 62: The Hub Card 52 receives Newbridge Cells from all of the UCS Cards 50 at a maximum rate of 200 Mbs and must buffer them in Queues before transmitting them on the UP-ISL 54 to the Switching Shelf 46. FIG. 5 shows the case of a 'Standalone Hub' where the data going on the UP-ISL 54 is simply looped back (64) to the DN-ISL 56. Separate Queues must be maintained for the different levels of ATM Cell priority.

3. Backplane Filtering 66: All UCS Cards must look at the Newbridge Header of each and every Cell on the 800

Mbs Drop Bus. If the particular UCS Card is addressed explicitly within the Newbridge header, or the UCS Card is a member of the indicated Multicast group, the UCS Card 50 reads the Newbridge Cell off the Drop Bus 68. This is the process of address filtering.

4. Output Queuing 70: Since the Drop Bus 68 is operating at 800 Mbs, the UCS Card 50 may receive more Newbridge Cells than it can instantaneously deal with. To prevent Cell loss an Output Queue 70 is required. UCS Cards must take into account the ATM Cell's priority when servicing the Output Queue so that different Qualities of Service can be provided.

5. Interface Adaptation 72: The ATM Cells filtered off the Drop Bus 68 must either be reassembled (for an Adaptation Card) or mapped (for a Cell Relay Card) into the Interface Specific format. These actions are referred to as Egress processing on the UCS card 50.

Figure 7:
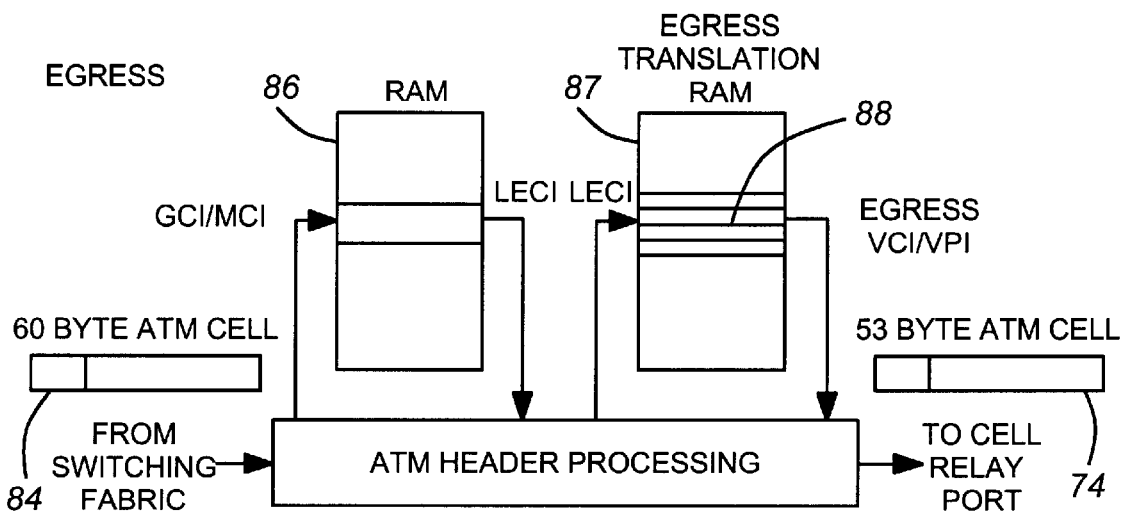
FIG. 7 shows the interface adaptation of FIG. 5.
Figure 6:
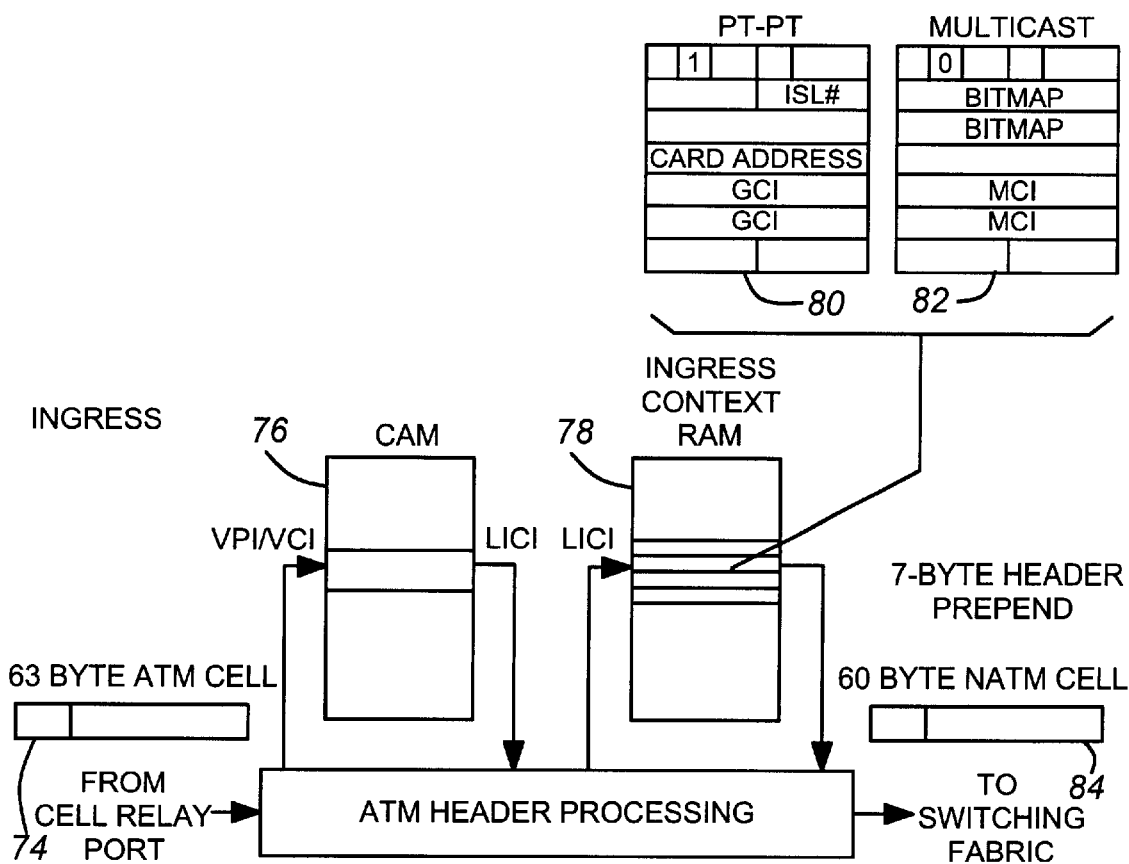
FIG. 6 shows at a higher level the backplane adaptation of FIG. 5.

FIGS. 6 and 7 show the next level of detail for the Backplane Adaptation 60 and Interface Adaptation 72 function for a Cell Relay card.

On Ingress, standard 53 byte ATM cells 74 are received from the Interface port. The Ingress ATM Header processing involves using the ATM cell's VPI/VCI fields to determine a Local Ingress Connection Identifier (LICI). This may be accomplished by various methods—FIG. 6 illustrates the use of a Contents Addressable Memory (CAM) 76 for this purpose.

Subsequent cell processing is done using the LICI—among other actions, Ingress Context RAM 78 is used to look-up the appropriate 7 byte Newbridge header (80 and 82) to be prepended to the standard ATM cell to form a 60 byte Newbridge ATM (NATM) cell 84.

On Egress, Newbridge ATM cells 84 are received from the switching fabric. The Egress ATM Header processing involves using the NATM cell's connection identification fields to determine a Local Egress Connection Identifier (LECI). This is accomplished by simply using a RAM to look-up the LECI 86. Subsequent cell processing is done using the LECI—among other actions, Egress Translation RAM 87 is used to look-up the appropriate VPI/VCI 88 to be placed in the outgoing standard 53 byte ATM cell 74.

According to the invention the ATM switch associates incoming cells to either the TDMA (point to multipoint) ARIC for low bandwidth services or any FDMA (point to point) ARIC for high bandwidth services.

The TDMA ARIC and the FDMA ARIC are used to support wireless links between the BTS and the Network Interface Units (NIUs), where the latter are located in the customers' premises. In addition to the ARIC card(s) the BTS can be equipped with any of the standard switch cards, e.g., Control, Services, Hub, OC-3, etc. ATM connections can be set up between the ARICs and most of the other available ATM interface cards. The BTS and the NIUs are managed by the Network Manager (e.g. Newbridge Mainstreet 46020) and the Network Element Manager (e.g. Newbridge Mainstreet 45020), respectively.

As indicated above ARICs may be equipped with either FDMA or TDMA functionality. On the TDMA ARIC, ports can only be used for TDMA applications, where the ARIC bandwidth is shared by multiple NIUs. On FDMA ARICs, each port is used by a single NIU.

The combiner 90 shown in FIG. 2 is used in the downstream direction to combine the output data streams from all the ARIC cards in the BTS. The combined intermediate frequency (IF) signal is forwarded to the outside transmitter (OTX) 92 where it is up-converted to the desired RF frequency and transmitted. In the upstream direction the outside receiver (ORX) 94 receives the RF signal, down-converts it to IF and then forwards the signal to the splitter. The splitter splits the down-converted IF signal so that each ARIC card in the BTS has its own copy of the received IF signal.

The ATM switch or base station component responsibilities that are specific to wireless are the control card and the ARIC(s). The Control Card is responsible for the configuration of NIU generic data, connection control (this includes assigning appropriate timeslots based on data entered by the user) and provides support for the ARIC. The functionality of the ARIC(s) will be described in detail later.

Also shown in FIG. 2 are the external equipment that consists of the combiner/splitter 90, the transmitter 92 and the receiver 94. The combiner/splitter takes the received IF signals from several ARICs, up to 6 for example, and combines them onto a single coaxial cable connected to the transmitter. This represents the combiner function. It also takes an IF signal from a single receiver, and forwards the identical signal on multiple coaxes connected to the several (e.g.12) ARICs (the splitter function). Therefore each ARIC receives the entire intermediate frequency. The combiner/splitter also supports at least two transmitter connections and at least two receiver connections to allow redundant configurations. It may be housed in one box providing both functions or in separate boxes.

The transmitter up-converts the intermediate frequency to the radio frequency (for example 28 GHz or 38 GHz) and transmits the up-converted signal over the air. It also amplifies the signal and provides a serial port interface for monitoring and configuration via the ARIC.

The receiver down-converts the received radio frequency (for example 25 GHz) to the intermediate frequency and transmits the down-converted signal over the coax cable. It also amplifies the signal and provides a serial port interface for monitoring and configuration via the ARIC.

Figure 8:
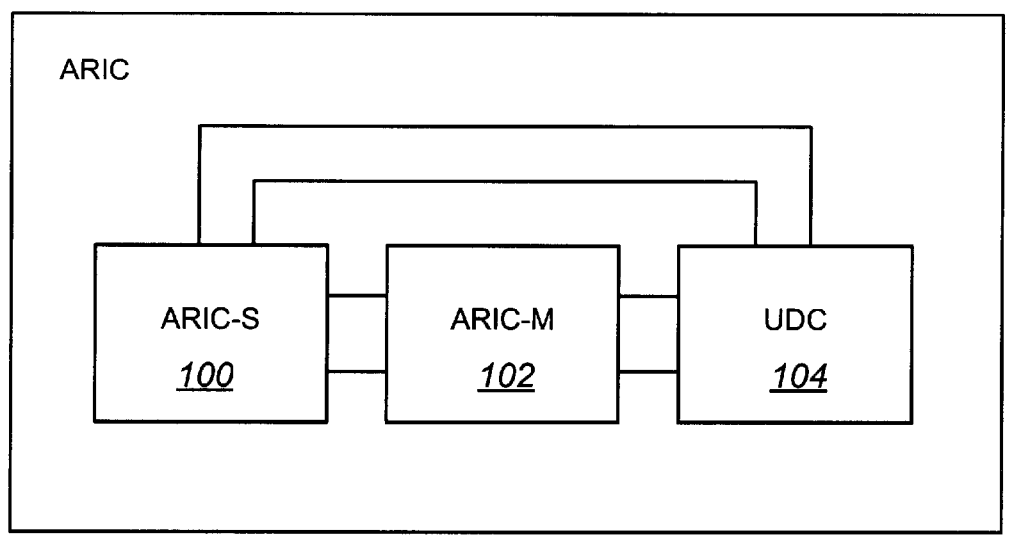
FIG. 8 illustrates the major components that comprise an ATM Radio Interface Card (ARIC) module.

FIG. 8 shows the major components that make up the ARIC module. These are: Services module 100 (also called ARIC-S); the modem module 102(also called the ARIC-M); and the up/down converter 104 also called the Tuner module. The ARIC-S 100 is responsible for the control of the Tuner module 104, the control of the transmitter 92 and receiver 94 using messaging via the ARIC-M 102, on card connection control, and the interface between the control card and the modem (for modem configuration), local NIU configuration/monitoring.

The Modem module or ARIC-M 102 is responsible for the transmission of a synchronization signal; the medium access control (MAC) layer, including framing, NIU status polling and calibration of NIU transmit power, frequency and timing; forward error correction; and the control port for configuring/monitoring the transmitter and receiver.

The Up/Down Converter (UDC) 104 (Tuner Module) takes a received signal from the modem module 102 at a known frequency and up-converts to the configured transmit IF frequency; and takes a received IF frequency and down-converts to a known frequency which is sent to the modem module 102.

Figure 9:
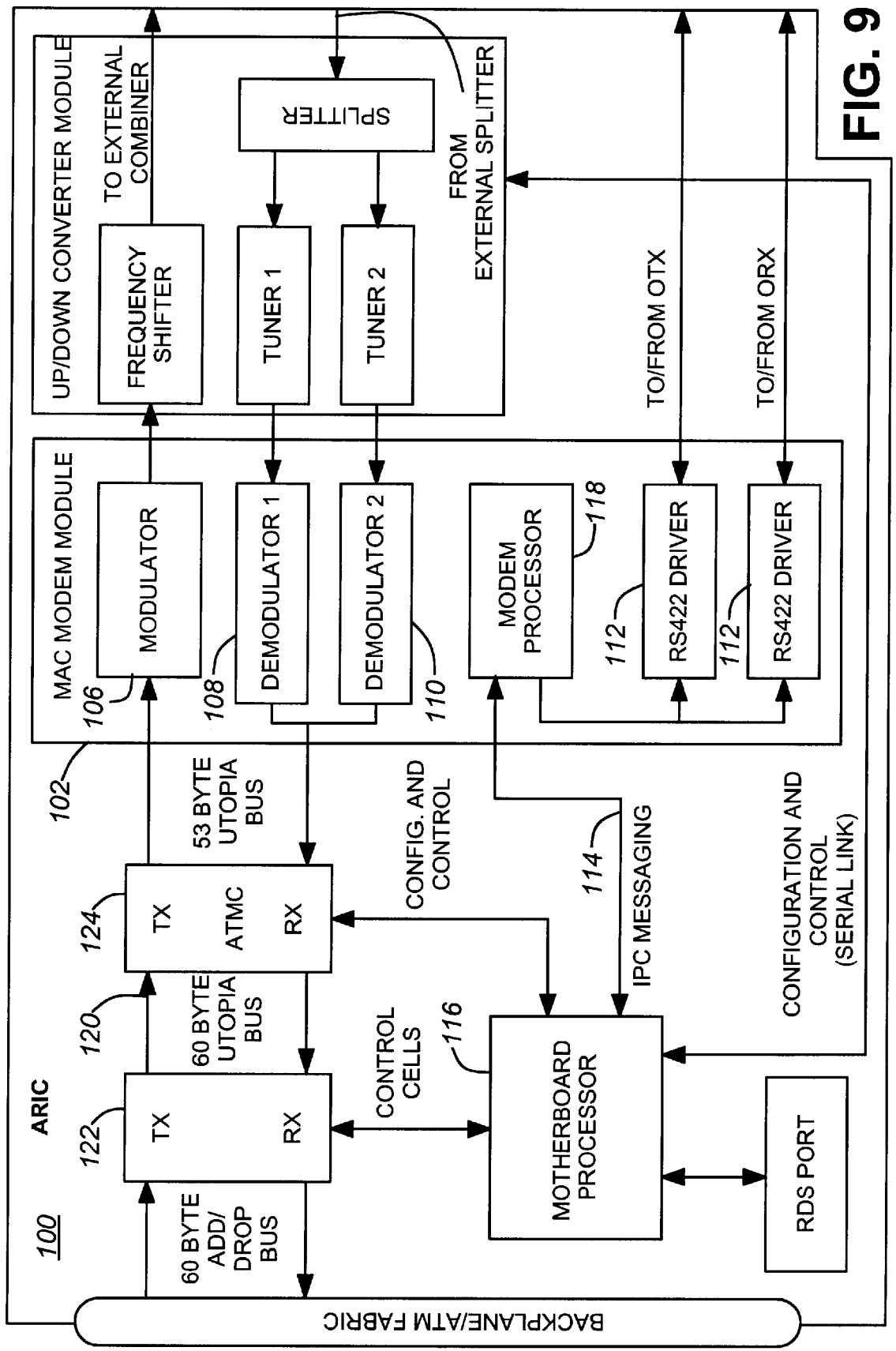
FIG. 9 shows the main functional units of the ARIC.

FIG. 9 shows the aforementioned major functional units of the ARIC card while standard items such as flash and RAM are not shown. The ARIC-M 102, daughter board to the ARIC-S 100, provides the modem functionality including a modulator 106 and two demodulators 108, 110. The ARIC-M 102 supports two control ports 112. The control ports are used to configure/monitor the transmitter and receiver.

The control ports are controlled by the modem module but they do not initiate or process any messages. Instead they just tandem messages between the serial ports and the interprocessor communication (IPC) bus 114. Therefore it is the ARIC-S 100 that sends and receives messages to/from the serial ports. There are no actual RS-422 connectors on the modem module. Instead a medium attachment unit (MAU- not shown) connected to the back of the ARIC is wired to a distribution panel which provides lightning protection. It is this distribution panel which provides the RS-422 connectors.

Communication between the ARIC-S and ARIC-M processors 116, 118 is done via an HDLC-based message interface 114 which is labeled as "IPC" (Interprocessor Communication). The Utopia bus 120 is not used to carry messages between the processors.

The radio input/output to/from the modem is always at a specific frequency. It is the responsibility of the Tuner Module 104, to shift the frequencies to/from the assigned intermediate frequency. The converter module receives configuration information from the ARIC-S processor 116 across a serial interface. This interface is also used for the monitoring of the module status.

The ARIC-S processor or motherboard processor 116 is the main control of the ARIC module and it is responsible for all communication with the control card. It contains a map of all the NIUs assigned to the ARIC with associated connection information. It is responsible for sending configuration information to the modem, along with sufficient NIU information that the modem can initiate NIU network entry. The control card is responsible for timeslot assignment for constant bit rate (CBR) connections. It relays this information to the ARIC-S 100 which in turn informs the ARIC-M 102. The MAC layer on the ARIC-M informs the NIUs of all CBR timeslot assignments and is also responsible for assigning dynamic timeslots for unspecified bit rate (UBR) upon NIU request.

The backplane interface 122 and the ATM traffic management controller (ATMC) 124 devices support the ATM interfaces for data connections and control messaging. The backplane interface 122 performs filtering of the ATM cells from the backplane 66 and egress adaptation of the Newbridge cells from the egress queue 70 to conventional ATM cells. In this context, filtering means selecting the appropriate cells from the shared drop bus 68. The ATMC 124 may be implemented with a Motorola MC92500. It performs ATM layer functions, and ingress and egress cell processing such as VPI/VCI address compression on ingress cells to an internal connection identifier (CI). It also performs translation of CI to appropriate VPI/VCI for egress cells. Further, the ATMC 124 performs usage parameter control (UPC) policing, collects statistics such as cell counts and performs OAM functions. The modem module acts as the (de) modulator as well as the MAC device driver. Using a couple of RS422 serial links the modem module controls the external OTX and ORX devices. A third serial link is provided to control the frequency shifter and the tuners.

The output/input from/to the ARIC card is connected to the combiner/splitter 90, see FIG. 2. The combiner/splitter combines the appropriately shifted IF signals from the different ARIC cards in the BTS in the transmit (TX) direction and splits the received aggregated IF signal in the receive (RX) direction. The combiner/splitter interfaces to the OTX transmitter and ORX receiver modules. The transmitter and receiver modules perform the up and down conversion of the IF and the Radio Frequency (RF) signals, respectively, and they are connected directly to the transmit and receive antennas. The OTX transmitter and ORX receiver modules are controlled by one of the ARIC cards in the BTS through a couple of serial links, see FIG. 2. The combiner/splitter module does not need to be controlled.

The available RF band is divided into the upstream and downstream bandwidths and the division does not have to be symmetrical. The upstream and downstream bandwidths are further divided into a number of smaller frequency bands, referred to as frequency channels. The downstream and upstream frequency channels may in general have different sizes.

Figure 10:
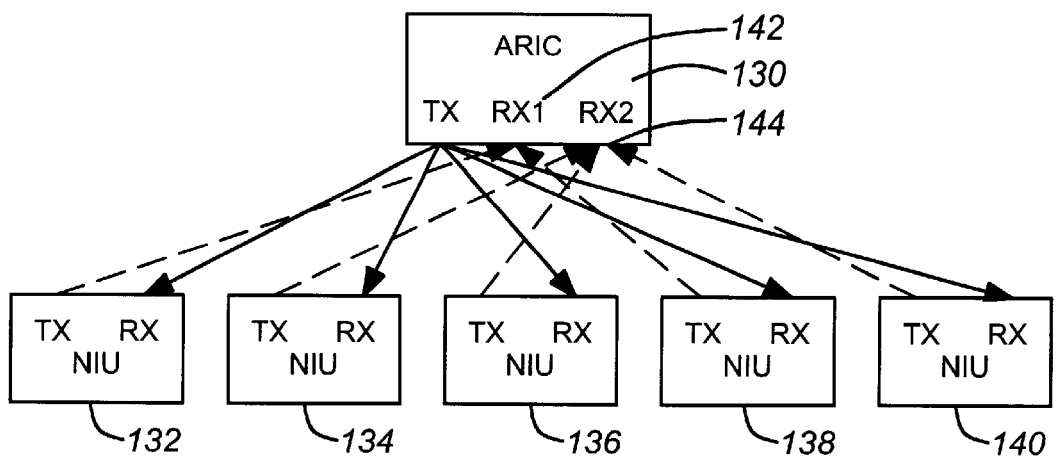
FIG. 10 illustrates wireless links between a TDMA ARIC and five NIUs.

A single ARIC/NIU can transmit in a single downstream/ upstream frequency channel, respectively. The ARIC can receive on two upstream frequency channels and the NIU can receive on one downstream frequency channel. FIG. 10 illustrates this graphically. In FIG. 10 there is one ARIC card 130 that maintains wireless links to five NIUs. Note, that the association is really with the ARIC port rather than the ARIC card but since there is only one port on the ARIC card of this embodiment the "port" and "card" mean the same in this context. The downstream data addressed for all the NIUs associated with a single ARIC card is transmitted by that ARIC card in one frequency channel. The receivers on all the NIUs associated with this ARIC card are tuned to this frequency channel and each of the NIUs "filters" the data that is addressed to it.

Looking specifically at TDMA, in the upstream each NIU is associated with one of the two ARIC receivers. In FIG. 10 NIU 132 and NIU 138 transmit in the frequency channel the first ARIC receiver 142 is tuned to and NIU 134, NIU 136 and NIU 140 transmit in the frequency channel the second ARIC receiver 144 is tuned to. A TDMA-based MAC is used to allow a number of NIUs to transmit in a single frequency channel or, in other words, to facilitate a point to multipoint topology between an ARIC card and a number of NIUs. Note that the TDMA MAC is implemented in the upstream direction only.

The reason for having two receivers 142, 144 on the ARIC card in this example is to increase the bandwidth in the upstream direction. This is needed because the current TDMA technology significantly decreases the frequency bandwidth utilization in the upstream direction.

The Intermediate Frequency (IF) physical interface is supported by the modem and UDC modules. The IF interface is a coaxial based continuous QPSK modulated signal in the downstream direction and a burst differential quadrature phase shift key (DQPSK) modulated signal in the upstream direction.

With regard to FDMA, the ARIC is a single port card with, for example, a maximum bandwidth of 27.62 Mb/s carried in a frequency channel of approximately 6 MHz. Each NIU is simply associated with a single FDMA ARIC card and point-to-point communications between the ARIC/ NIU pair may be effected over respective frequency channels for the upstream and downstream directions. The modem module within the FDMA ARIC preferably supports 16 or 64 QAM modulation. Depending on the modulation mechanism chosen and the selected symbol rates the bandwidth of the ARIC port, for example, can be varied, typically from 15 to 155 Mb/s. In this context 16 QAM encodes 4 bits of data into a single symbol whereas 64 QAM encodes 6 bits per symbol. QPSK, on the other hand encodes only 2 bits per symbol.

The TDMA air interface conforms to the DAVIC (Digital Audio-Visual Council) LMDS specification, with modifications for higher bandwidth. The following is a high level description of the air interface which is included here to make the contents of this document more understandable.

Figure 11:
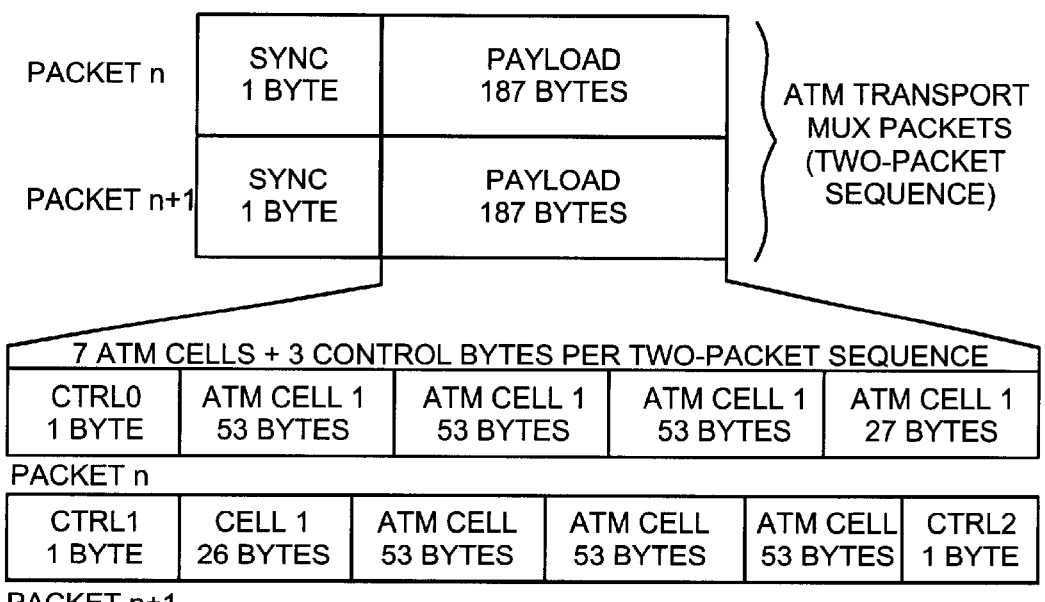
FIG. 11 depicts a Digital Audio-Visual Council (DAVIC) compliant LMCS downlink packet structure.

The Davic down-link, as shown in FIG. 11, consists of MPEG (Motion Picture Experts Group) packets sent in units of two which contain a total of 7 ATM cells and 3 control bytes. A SYNC byte precedes each packet. The first packet in each frame is considered the frame start packet and is used by the MAC layer to provide information to the NIUs.

Figure 12:
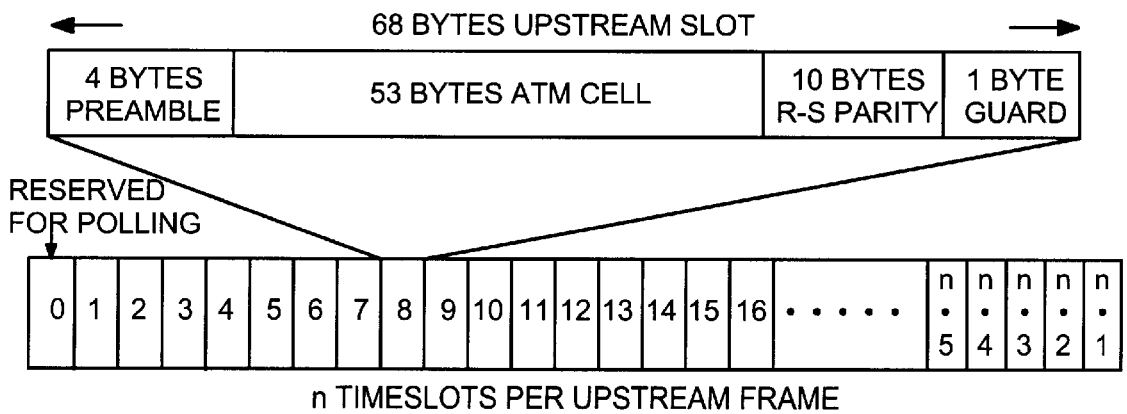
FIG. 12 illustrates a DAVIC compliant LMCS uplink packet structure.

In order to allow multiple devices to share the uplink, it has a different format but is tightly coupled with the downlink framing structure. The uplink consists of multiple timeslots, each of which can be independently assigned to an NIU and can be used to send a single ATM cell. This is shown in FIG. 12.

Each up-link timeslot falls into one of the following categories:

idle timeslot—timeslot is not currently in use for any application.

polling timeslot—timeslot has been reserved for polling. Timeslot zero is reserved for polling but additional timeslots may be used.

guard timeslot—timeslot follows a polling timeslot and is not used. Instead it acts as a poll slot buffer to ensure that an improperly calibrated NIU that is going through network entry does not affect transmissions from other NIUs. The number of guard slots required depends on the cell size and is therefore configurable.

contention timeslot—timeslot may be used by an NIU to make requests for bandwidth.

reserved timeslot—timeslot has been assigned to an NIU. The timeslot may either be assigned permanently (permanently means until the assignment is removed) or dynamically for a defined number of frames.

A single timeslot has a bandwidth of 75377 bps (bits per second) which is sufficient to accommodate a single basic T1/E1 DSO (e.g. no signaling) with ATM Adaptation Layer (AAL-1) segmentation and reassembling (SARing) and operation and maintenance (OAM) overhead.

Bandwidth assignments must also take into account the overhead of control signaling. For example, ATM Control Messaging connections to T1/E1 NIUs are CAC'd at 32K sustained and 64K peak. Therefore, using a very simple calculation, it can be assumed that 1/2 timeslot must be dedicated to each T1/E1 NIU for ATM Control messaging. In addition, contention slots are required to allow the NIUs to request dynamically assigned timeslots.

While particular embodiments of the invention have been described and illustrated it will be apparent to one skilled in the art that numerous variations and alternatives can be implemented. It is to be understood, however that such variations and alternatives will fall within the scope of the invention as defined by the appended claims.

Glossary

The following terms, many of which are used in the foregoing description, are defined herein for the convenience of the reader.

ACM ATM Control Messaging
ARIC ATM Radio Interface Card—a 36170 card that carries data formatted in ATM cells and interfaces to external radio equipment.
ARIC-M ATM Radio Interface Card-Modem:—the modem board of the ARIC.
ARIC-S ATM Radio Interface Card-Services:—the motherboard of the ARIC.
Bellcore Bell Communications Research
BTS Base Transceiver Station—In this context the 36170 which contains the ARIC cards. In this document the term base station and base transceiver station are used synonymously.
CDV Cell Delay Variation
CE Circuit Emulation
CO Central Office
CPE Customer Premises Equipment
CPSS Control Packet Switching System. The packet switching protocol used for communication between Newbridge network entities.
EMS Element Management System
ESN Electronic Serial Number
ETS1 European Telecommunications Standards Institute.
FTMA Frequency Division Multiple Access
GCRA Generic Cell Rate Adaptation
IPC Inter-processor Communication
ISC Internetworking Services Card. Formerly called the PIPE card.
LMCS Local Multipoint Communications System. A Canadian 28 GHz broadband wireless cellular system capable of supporting a combination of broadcast TV distribution and bi-directional broadband voice and data services in a point to multipoint configuration.
LMDS Local Multipoint Distribution System. U.S. equivalent to LMCS.
NIU Network Interface Unit. Part of the Subscriber Unit that sits inside the building, contains radio modems (but not the RF parts), interfaces to the subscriber equipment (ethernet, ATM25, OC3c, T1/E1, video, depending on the NIU model), and all the software to interface the subscriber signal to the ATM world.
NIU-M Network Interface Unit-Modem—the modem board of the NIU.
NIU-S Network Interface Unit-Services—the mother board of the NIU.
NMS Network Management System
NMTI Node Management Terminal Interface: The local user interface for a Newbridge network element.
OAM Operation and Maintenance. This is typically used to OAM cells on an ATM interface.
OC-3 Optical Carrier-level 3. An optical SONET signal at 155.52 Mb/s.
PSTN Public Switched Telephone Network.
PVC Permanent Virtual Circuit. A virtual connection which is established administratively via a service order process.
RMS Radio Modem Shelf
SOHO Small Office, Home Office
STel Stanford Telecom. An OEM modem supplier.
SVC Switched Virtual Circuit. A connection which is set up on demand via a signaling protocol. Such connections tend to be of shorter duration than PVCs, and are not automatically re-established after a system restart.
TMDA Time Division Multiple Access
UNI User Network Interface. The interface used to connect user equipment to network equipment.
VC Virtual Channel—A logical communication channel that is available across a physical ATM interface.
VCC Virtual Channel Connection: A virtual channel that has end-to-end significance and is a concatenation of the virtual channel links that extends between the points where the ATM service users access the ATM Layer. The points at which the ATM cell payload is passed to, or received from, the users of the ATM Layer for processing signify the endpoints of a VCC.
VCI Virtual Channel Identifier: A field in the ATM header that identifies virtual channels.
VP Virtual Path: A logical communication channel that is available across a physical ATM interface and that can carry one or more virtual channels.
VPI Virtual Path Identifier. An 8 bit value used to identify an ATM path and carried in the cell header. Like a VCI it is locally significant and refers to the VPL active on the local UNI which comprises a large scope VPC.

We claim:

1. An ATM radio interface card (ARIC) for use in a base station of a broadband wireless system for digital communication between an ATM backbone and a network interface unit (NIU) at a customer site over a wireless link utilizing shared radio access, said ARIC comprising: a modem for modulating said digital communication received from said ATM backbone; a tuner for converting said modulated communication to a radio frequency (RF) signal; and a control module for controlling transmission of said RF signal, wherein said shared radio access employs frequency division multiple access (FDMA) and time division multiple access (TDMA) for high bandwidth services and low bandwidth services respectively.

2. An ARIC as defined in claim 1 for bi-directional communication between said base station and a plurality of NIUs located at customer premises within a cellular area.

3. An ARIC as defined in claim 2 wherein each of said plurality of NIUs is in a fixed location within said cellular area.

4. An ARIC as defined in claim 3 wherein said modem includes a demodulator for reconfiguring communication received from said NIUs.

5. An ARIC as defined in claim 4 wherein said modem polls each of said NIUs for status information and establishes transmit power levels, frequency and timing.

6. An ARIC as defined in claim 1 wherein said modem generates a synchronization signal for transmission to said NIU.

7. An ARIC as defined in claim 4 wherein said tuner includes a first converter for up converting an Intermediate Frequency (IF) signal from said modulator to a Radio Frequency (RF) signal for transmission to said NIU and a second converter for down converting a RF signal received from said NIU to an IF signal for said demodulator.

8. An ARIC as defined in claim 1 wherein said modem supports one or more control ports interfacing with an external transmitter/receiver.

9. An ARIC as defined in claim 8 wherein said control module controls said external transmitter/receiver.

10. A method for communicating digital information between a base station and a network interface unit (NIU) over A wireless link utilizing shared radio access comprising; providing at said base station an ATM radio interface card (ARIC) having a modem, a tuner, and a controller; configuring said digital information at said modem into an intermediate frequency (IF) signal; converting said IF signal into a radio frequency (RF) signal at said tuner; and delivering said RF signal to a transmitter for transmission to said NIU over said wireless link wherein said shared radio access employs FDMA and TDMA for high bandwidth services and low bandwidth services respectively.

11. A method as defined in claim 10 for bi-directional communication between said base station and a plurality of NIUs located at fixed locations within a cellular area.

12. A method as defined in claim 11 wherein said tuner is provided with means to receive a RF signal from at least one of said NIUs and to down convert said RF signal to an IF signal for delivery to a demodulator in said modem.

13. An ARIC as defined in claim 1 wherein said TDMA utilizes a quadrature phase shift keying (QPSK) modulation scheme.

14. An ARIC as defined in claim 1 wherein in said FDMA employs quadrature amplitude modulation (QAM).

* * * * *